United States Patent [19]
Hoarty

[11] Patent Number: 5,883,661
[45] Date of Patent: Mar. 16, 1999

[54] OUTPUT SWITCHING FOR LOAD LEVELLING ACROSS MULTIPLE SERVICE AREAS

[75] Inventor: W. Leo Hoarty, Morgan Hill, Calif.

[73] Assignee: ICTV, Inc., Los Gatos, Calif.

[21] Appl. No.: 551,461

[22] Filed: Nov. 1, 1995

Related U.S. Application Data

[63] Continuation-in-part of Ser. No. 333,957, Nov. 3, 1994, Pat. No. 5,587,734, which is a continuation-in-part of Ser. No. 56,958, May 3, 1993, Pat. No. 5,526,034, which is a continuation-in-part of Ser. No. 877,325, May 1, 1992, Pat. No. 5,412,720, which is a continuation-in-part of Ser. No. 754,932, Sep. 10, 1991, Pat. No. 5,220,420, which is a continuation-in-part of Ser. No. 589,205, Sep. 28, 1990, Pat. No. 5,093,718.

[51] Int. Cl.[6] ..................................................... H04N 7/10
[52] U.S. Cl. .................................. 348/7; 348/12; 348/13; 455/3.1; 455/4.2; 455/5.1
[58] Field of Search .......................... 348/6–17; 455/3.1, 455/4.1, 4.2, 5.1, 6.1, 6.2; H04N 7/16, 7/10

[56] References Cited

U.S. PATENT DOCUMENTS

| | | |
|---|---|---|
| 3,889,050 | 6/1975 | Thompson .................................. 178/5 |
| 4,032,972 | 6/1977 | Saylor ..................................... 358/142 |

(List continued on next page.)

FOREIGN PATENT DOCUMENTS

| | | |
|---|---|---|
| 1302554 | 6/1992 | Canada . |
| 0 449 633 | 10/1991 | European Pat. Off. . |
| 0 477 786 | 4/1992 | European Pat. Off. . |
| 0 568 453 | 11/1993 | European Pat. Off. . |
| 0 594 350 | 4/1994 | European Pat. Off. . |
| 63-33988 | 2/1988 | Japan . |
| 263985 | 10/1988 | Japan . |
| 241993 | 9/1989 | Japan . |
| 17776 | 1/1990 | Japan . |
| 2 248 955 | 4/1992 | United Kingdom . |
| WO 82/02303 | 7/1982 | WIPO . |
| WO 89/08967 | 9/1989 | WIPO . |
| WO 90/13972 | 11/1990 | WIPO . |
| WO 93/22877 | 11/1993 | WIPO . |
| WO 94/16534 | 7/1994 | WIPO . |
| WO 95/15658 | 6/1995 | WIPO . |

OTHER PUBLICATIONS

Hoarty, W. Leo, "The Smart Headend—A Novel Approach to Interactive Television", Jun. 9, 1995.

Ellis, M.L., "Index: An Operational Interactive Cabletext System" *IEEE Journal on Selected Areas in Communications*, vol. sac–1, No. 2, Feb. 1983, pp. 285–294.

Dr. M. Farooque Mesiya, *A Passive Optical/Coax Hybrid Network Architecture for Delivery of CATV, Telephony and Data Services*, 1993 NCTA Technical Papers, Jun., 1993, pp. 358–364.

Dukes, Stephen D., "Photonics for cable television system design," *Communications Engineering and Design*, 1992.

Langenberg, Earl, "Integrating Entertainment and Voice of the Cable Network", pp. 187–194.

Large, David, "Tapped Fiber vs. Fiber–Reinforced Coaxial CATV Systems: A Comparison of Evolutionary Paths", pp. 1–21, 1989.

*Insight*—brochure.

(List continued on next page.)

*Primary Examiner*—Michael Lee
*Attorney, Agent, or Firm*—Bromberg & Sunstein LLP

[57] ABSTRACT

A television information system for distributing television information services, including interactive service, to subscribers divided among a plurality of service areas. A system manager receives requests for service from subscribers and assigns each requesting subscriber to one of a plurality of video provider elements. The video provider element provides a television information service to the requesting subscriber. An rf processing unit associated with the video provider element places the television information service on a carrier frequency assigned to the subscriber by the system manager. An rf switch controlled by the system manager directs each carrier frequency to the service area of the corresponding requesting subscriber.

25 Claims, 10 Drawing Sheets

U.S. PATENT DOCUMENTS

| | | |
|---|---|---|
| 4,077,006 | 2/1978 | Nicholson .................................. 325/308 |
| 4,081,831 | 3/1978 | Tang et al. ................................. 358/114 |
| 4,245,245 | 1/1981 | Matsumoto et al. ..................... 358/122 |
| 4,247,106 | 1/1981 | Jeffers et al. .......................... 273/85 G |
| 4,253,114 | 2/1981 | Tang et al. ................................. 358/114 |
| 4,264,924 | 4/1981 | Freeman ..................................... 358/86 |
| 4,290,142 | 9/1981 | Schnee et al. ............................... 455/3 |
| 4,302,771 | 11/1981 | Gargini ...................................... 358/86 |
| 4,367,557 | 1/1983 | Stern et al. ................................... 455/4 |
| 4,450,477 | 5/1984 | Lovett ....................................... 358/86 |
| 4,454,538 | 6/1984 | Toriumi ..................................... 358/86 |
| 4,466,017 | 8/1984 | Banker ..................................... 358/120 |
| 4,471,380 | 9/1984 | Mobley ..................................... 358/120 |
| 4,491,983 | 1/1985 | Pinnow et al. ............................ 455/612 |
| 4,506,387 | 3/1985 | Walter ..................................... 455/612 |
| 4,507,680 | 3/1985 | Freeman ..................................... 358/86 |
| 4,509,073 | 4/1985 | Baran et al. ............................... 358/86 |
| 4,523,228 | 6/1985 | Banker ..................................... 358/120 |
| 4,533,948 | 8/1985 | McNamara et al. ..................... 358/122 |
| 4,536,791 | 8/1985 | Campbell et al. ....................... 358/147 |
| 4,538,174 | 8/1985 | Gargini et al. .............................. 358/86 |
| 4,538,176 | 8/1985 | Nakajima et al. .......................... 358/86 |
| 4,567,517 | 1/1986 | Mobley ..................................... 358/120 |
| 4,573,072 | 2/1986 | Freeman ..................................... 358/86 |
| 4,591,906 | 5/1986 | Morales-Garza et al. ................. 358/84 |
| 4,602,279 | 7/1986 | Freeman ..................................... 358/86 |
| 4,616,263 | 10/1986 | Eichelberger ............................ 358/185 |
| 4,627,105 | 12/1986 | Ohashi et al. ............................ 455/612 |
| 4,633,462 | 12/1986 | Stifle et al. ................................ 370/85 |
| 4,695,880 | 9/1987 | Johnson et al. ............................. 358/86 |
| 4,706,121 | 11/1987 | Young ...................................... 358/142 |
| 4,709,418 | 11/1987 | Fox et al. ................................. 455/612 |
| 4,710,971 | 12/1987 | Nozaki et al. ............................ 455/179 |
| 4,748,689 | 5/1988 | Mohr ........................................ 455/612 |
| 4,760,442 | 7/1988 | O'Connell et al. ......................... 358/86 |
| 4,769,833 | 9/1988 | Farleigh et al. .......................... 379/105 |
| 4,769,838 | 9/1988 | Hasegawa ..................................... 380/7 |
| 4,801,190 | 1/1989 | Imoto .................................... 350/96.16 |
| 4,821,102 | 4/1989 | Ichikawa et al. ........................ 358/183 |
| 4,823,386 | 4/1989 | Dumbauld et al. ......................... 380/13 |
| 4,827,253 | 5/1989 | Maltz ....................................... 340/734 |
| 4,829,372 | 5/1989 | McCalley et al. .......................... 358/86 |
| 4,847,700 | 7/1989 | Freeman ................................... 358/343 |
| 4,860,379 | 8/1989 | Schoeneberger et al. ................... 455/5 |
| 4,891,694 | 1/1990 | Way .......................................... 358/86 |
| 4,901,367 | 2/1990 | Nicholson .................................... 455/5 |
| 4,903,126 | 2/1990 | Kassatly .................................. 358/146 |
| 4,912,760 | 3/1990 | West, Jr. et al. ............................ 380/7 |
| 4,918,516 | 4/1990 | Freeman ..................................... 358/86 |
| 4,922,532 | 5/1990 | Farmer et al. ............................. 380/15 |
| 4,941,040 | 7/1990 | Pocock ...................................... 358/88 |
| 4,947,244 | 8/1990 | Fenwick et al. ............................ 358/86 |
| 4,963,995 | 10/1990 | Lang ....................................... 358/335 |
| 4,975,771 | 12/1990 | Kassatly .................................. 358/146 |
| 4,994,909 | 2/1991 | Graves et al. .............................. 358/86 |
| 4,995,078 | 2/1991 | Monslow et al. .......................... 380/10 |
| 5,008,934 | 4/1991 | Endoh ........................................ 380/15 |
| 5,014,125 | 5/1991 | Pocock et al. ............................. 358/86 |
| 5,027,400 | 6/1991 | Baji et al. .................................. 380/20 |
| 5,057,917 | 10/1991 | Shalkauser et al. ..................... 358/135 |
| 5,060,262 | 10/1991 | Bevins, Jr. et al. ....................... 380/19 |
| 5,077,607 | 12/1991 | Johnson et al. ........................... 358/86 |
| 5,093,718 | 3/1992 | Hoarty et al. .............................. 358/84 |
| 5,109,414 | 4/1992 | Harvey et al. ................................ 380/9 |
| 5,113,496 | 5/1992 | McCalley et al. ....................... 395/200 |
| 5,119,188 | 6/1992 | McCalley et al. ......................... 358/86 |
| 5,130,792 | 7/1992 | Tindell et al. ............................. 358/85 |
| 5,132,992 | 7/1992 | Yurt et al. ................................. 375/122 |
| 5,133,079 | 7/1992 | Ballantyne et al. ..................... 455/4.1 |
| 5,136,411 | 8/1992 | Paik et al. ............................... 359/125 |
| 5,172,413 | 12/1992 | Bradley et al. ........................... 380/20 |
| 5,191,410 | 3/1993 | McCalley et lal. ........................ 358/86 |
| 5,195,092 | 3/1993 | Wilson et al. ........................ 370/94.2 |
| 5,208,665 | 5/1993 | McCalley et al. ........................ 358/86 |
| 5,220,420 | 6/1993 | Hoarty et al. .............................. 358/86 |
| 5,231,494 | 7/1993 | Wachob ................................... 358/146 |
| 5,236,199 | 8/1993 | Thompson, Jr. ......................... 273/439 |
| 5,247,347 | 9/1993 | Litteral et al. ............................. 358/85 |
| 5,253,341 | 10/1993 | Rozmanith et al. ..................... 395/200 |
| 5,319,455 | 6/1994 | Hoarty et al. ................................ 348/7 |
| 5,355,162 | 10/1994 | Yazolino et al. .......................... 348/11 |
| 5,410,343 | 4/1995 | Coddington et al. ....................... 348/7 |
| 5,410,344 | 4/1995 | Graves et al. ............................... 348/1 |
| 5,412,415 | 5/1995 | Cook et al. ................................. 348/6 |
| 5,418,559 | 5/1995 | Blahut ...................................... 348/10 |
| 5,442,389 | 8/1995 | Blahut et al. ............................... 348/7 |
| 5,495,283 | 2/1996 | Cowe ......................................... 348/6 |
| 5,528,281 | 6/1996 | Grady et al. ................................ 348/7 |
| 5,537,404 | 7/1996 | Bentley et al. ......................... 370/60.1 |
| 5,539,449 | 7/1996 | Blahut et al. ............................... 348/7 |
| 5,559,549 | 9/1996 | Hendricks et al. ......................... 348/6 |
| 5,579,143 | 11/1996 | Huber ...................................... 359/130 |
| 5,583,927 | 12/1996 | Ely et al. ................................. 379/207 |
| 5,592,470 | 1/1997 | Rudrapatna et al. .................... 370/320 |
| 5,600,364 | 2/1997 | Hendricks et al. ......................... 348/1 |
| 5,600,573 | 2/1997 | Hendricks et al. ................. 364/514 R |

OTHER PUBLICATIONS

Le Gall, Didier, "MPEG: A Video Compression Standard for Multimedia Applications", Communication of the ACM, vol. 34, No. 4, Apr., 1991, New York, NY.

Tamitani et al., "An Encoder/Decoder Chip Set for the MPEG Video Standard", 1992 IEEE International Conference on Acoustics, vol. 5, Mar., 1992, San Francisco, CA.

Van der Star, Jack A.M., "Video on Demand Without Compression: A Review of the Business Model, Regulation and Future Implication".

"Distributed Switching for Data Transmission over Two–Way CATV", Tarek N. Saaadawi et al., *IEEE Journal on Selected Areas in Communications*, vol. SAC–3, No. 2, Mar., 1985.

"The Architecture of Videotex Systems", Jan Gecsei, Chapter 6, pp. 77–79, 1983.

"Two–way Applications for Cable Television Systems in the 70's", *IEEE Spectrum*, Jurgen, Nov. 1971, pp. 39–52.

Terry, Jack, "Alternative Technologies and Delivery Systems for Broadband ISDN Access", IEEE Communications Magazine, Aug., 1992, pp. 58–64.

OUTPUT SWITCHING FOR LOAD LEVELLING ACROSS MULTIPLE SERVICE AREAS

This application is a continuation-in-part of U.S. application Ser. No. 08/333,957, filed Nov. 3, 1994, Pat. No. 5,587,734, which is a continuation-in-part of U.S. application Serial No. 08/056,958, filed May 3, 1993, Pat. No. 5,526,034, which is a continuation-in-part of U.S. application Ser. No. 07/877,325, filed May 1, 1992, Pat. No. 5,412,720, which in turn is a continuation-in-part of U.S. application Ser. No. 07/754,932, filed Sep. 10, 1991, Pat. No. 5,220,420, which is a continuation-in-part of U.S. application Ser. No. 07/589,205, filed Sep. 28, 1990, issued as U.S. Pat. No. 5,093,718. These related applications and international patent publication WO 93/22877, published Nov. 11, 1993, are hereby incorporated herein by reference.

TECHNICAL FIELD

The present invention relates to cable television systems having two-way communications capability with the user.

BACKGROUND OF THE INVENTION

Television has long been viewed as a one-way information service. Television programming is provided over a number of channels and broadcasts over a wide viewing area. The television signals may be provided through over-air transmission, coaxial cable, a combination of fiber and coaxial cables (known as hybrid fiber/coax), or via satellite. More recently, interest has developed in the ability to provide interactive or two-way communications through television. One method for providing interactive television services is to provide a home with a computer processor with graphical output capability (also known as multimedia processing). Such a processor may be made to modify a television screen to reflect a user's inputs to the system. Thus, an interactive television application can be run on the computer processor with the output of the application viewed on the television while computer server systems at the headend provides the underlying data. Such a system requires that an expensive computer system be placed at each home with further expensive high speed data communications modem technology to link the computer system to the data server computers back at the headend or central office.

Another option for providing interactive television service to homes is to provide the interactive processing ability at the headend of the broadband system with just its output sent to the home for viewing and user inputs from the home are sent to the headend to provide input to the headend system to control its output back to the home. An immediate advantage to locating the processing systems at the headend is that the operator only needs one processor for each active, or simultaneous, user. This contrasts the first method of placing a processor in each subscribers home whether it is used or not. With the processing placed in a central location such as a broadband system headend, an interactive television system could be built much like a telephone switching system. When a user wishes an interactive video service, a call is set-up where a user is assigned a processor card within the central switch and is also assigned a radio frequency (TV) channel between the central switch and that subscriber's home over which to view the interaction. Commands from the user's remote control in the home are relayed back to the headend and directed to the processor card serving that user. The output of the card is viewed by the user over his or her private channel on the user's television set. The systems resources, including the private channel, remain assigned to the individual user for the duration of use and, when the user tunes back to broadcast channels, these resources returned to an allocation pool available for another user.

In one paper, it has been suggested that interactive services be delivered to individual busses on a demand basis only. Large, D., "Tapped Fiber vs. Fiber-Reinforced Coaxial CATV Systems", IEEE LCS Magazine, February, 1990, pp. 12 et seq. A three level distributed switching system was proposed, with one switch at the headend to switch among hubs, one at each hub to switch among distribution lines, and a third level interdiction circuit to select the service for each dwelling. No architecture for such a scheme was proposed.

Van der Star, Jack A. M., "Video on Demand Without Compression: A Review of the Business Model, Regulation and Future Implication", discusses employing frequency re-use to distribute video-on-demand. The conventional cable trunk is split to produce separate feeds for each neighborhood. A video-on-demand block of frequencies is combined with the conventional frequencies. The video-on-demand frequencies are reused in each neighborhood. Each neighborhood trunk appears to be associated with a plurality of agile modulators equal to the number of video-on-demand channels. The article recommends that the number of video-on-demand channels equal 10% of the number of subscribers on the neighborhood trunk. The article further calls for an addressable decoder for each subscriber.

SUMMARY OF THE INVENTION

The present invention provides in a preferred embodiment a system that achieves distribution of interactive television information services on a demand basis, and it does so with surprising economy by sharing resources including: multimedia processor cards, information and video server computers, and the bandwidth on a broadband plant which has been assigned to interactive television services, expected to be ten to thirty percent of the available broadband plant bandwidth.

In a preferred embodiment, the invention provides an interactive television information system including a plurality of video providers. The video providers may include selection elements and interactive elements. The video providers are individually assignable to a subscriber from a subscriber pool. A system manager sub-system assigns an interactive element or a selection element in addition to a carrier frequency to a requesting subscriber. The system manager controls placement of the information service selected by the subscriber on the carrier frequency assigned to that subscriber. The subscriber pool is spread over a plurality of service areas. Each service area is served by a plurality of carrier frequencies that are reused from one service area to the next. An rf switch controlled by the system manager directs each of the plurality of carrier frequencies from the video providers to one or more of the service areas. This novel approach can be easily conceptualized by considering the various television frequencies used by the switch as the vertical axis of a metropolitan area switching system. The frequencies are then physically switched to send the signal to the various requesting neighborhoods, forming the horizontal axis of this x-y switch. Using frequency on one axis and physically switching on the other axis provides signals to potentially thousands of simultaneous users economically. In this manner, an information service can be addressed to the assigned subscriber by the subscriber's service area and a carrier frequency for use within that service area. The system manager controls the rf switch so that information services are provided to the correct subscribers. The system is managed so that identical carrier frequencies carrying different information services are always directed to separate subscriber service areas.

In accordance with the system of the present invention, the video providers are shared by the subscribers of a subscriber pool covering a plurality of service areas. The video providers are assigned and reassigned on a demand basis to only those subscribers requesting service at a particular time. Since the actual peak usage at any given time will only be a fraction of the total number of subscribers, the number of video providers, particularly interactive elements, will typically be substantially less than the total number of subscribers in the subscriber pool. A contention-based system, such as this, needs extra capacity beyond the capacity needed to serve the average peak of users to cover up, to a prescribed degree, the unpredictable behavior of a population of users. A contention-based system, by definition, will block some users from access to the system when capacity equals a certain prescribed number of users. This block factor is usually set such that, during normal usage, a typical user will only experience denial of service, every one in "n" tries.

An embodiment of the system provides an rf processing means for placing the selected television information services on one of the plurality of carrier frequencies. The rf processing means may be set to a fixed carrier frequency. Alternatively, a number of rf processing means may be provided in which the carrier frequency is adjustable in response to the system management. The use of frequency-agile rf modulators is another aspect of the invention for reducing the total number of components required for servicing an entire subscriber pool.

In a further embodiment serving an entire city, the city is divided into a number of subscriber pools, each having a plurality of service areas. Each subscriber pool is served by a system of the present invention. By distributing the handling of an entire city into a number of systems, each with its own subscriber pool, system costs can be reduced. The inventors recognize that once the subscriber pool is of a sufficient size, further reduction in overhead and thus the required additional components for serving peak usage is not reduced significantly any further. Recognizing that no further advantage is provided by making the system bigger in a city, the present invention advantageously divides the city's subscribers into a number of subscriber pools.

BRIEF DESCRIPTION OF THE DRAWINGS

These and other aspects of the invention will be more readily understood by reference to the following detailed description taken with the accompanying drawings.

DETAILED DESCRIPTION OF THE PRESENTLY PREFERRED EMBODIMENTS

For the purposes of the description herein and the claims that follow it, unless the context otherwise requires, the term "broadband distribution system" or "broadband system" includes all integrated systems for delivery of any information service to subscribers for use in connection with their televisions. These include conventional cable television systems utilizing coaxial cable for distribution primarily of broadcast and pay television programming, cable television systems using fiber optics and mixed fiber optic-coaxial cable (called hybrid fiber-coax systems), as well as other means for distribution of information services to subscribers. Similarly, unless the context otherwise requires, the term "information service" includes any service capable of being furnished to a television viewer having an interface permitting (but not necessarily requiring) interaction with a facility of the broadband system provider, including but not limited to an interactive information service, video-on-demand, local origination service, community event service, regular broadcast service, etc. A "television information signal" is any signal that may be utilized by a television for video display, regardless of the form of the television information signal, including a standard NTSC-modulated rf carrier, an MPEG-compressed digital data stream, or any other format. "Interactive television service" means an information service that utilizes two-way communication between a subscriber and a facility of the cable provider. When a subscriber is receiving interactive television service, it means that the cable provider is providing an information service to the home interface controller in response to a communication from the subscriber to the headend; it is not necessary that the subscriber continue communicating with the cable provider once interactive service has begun.

Figure 1:
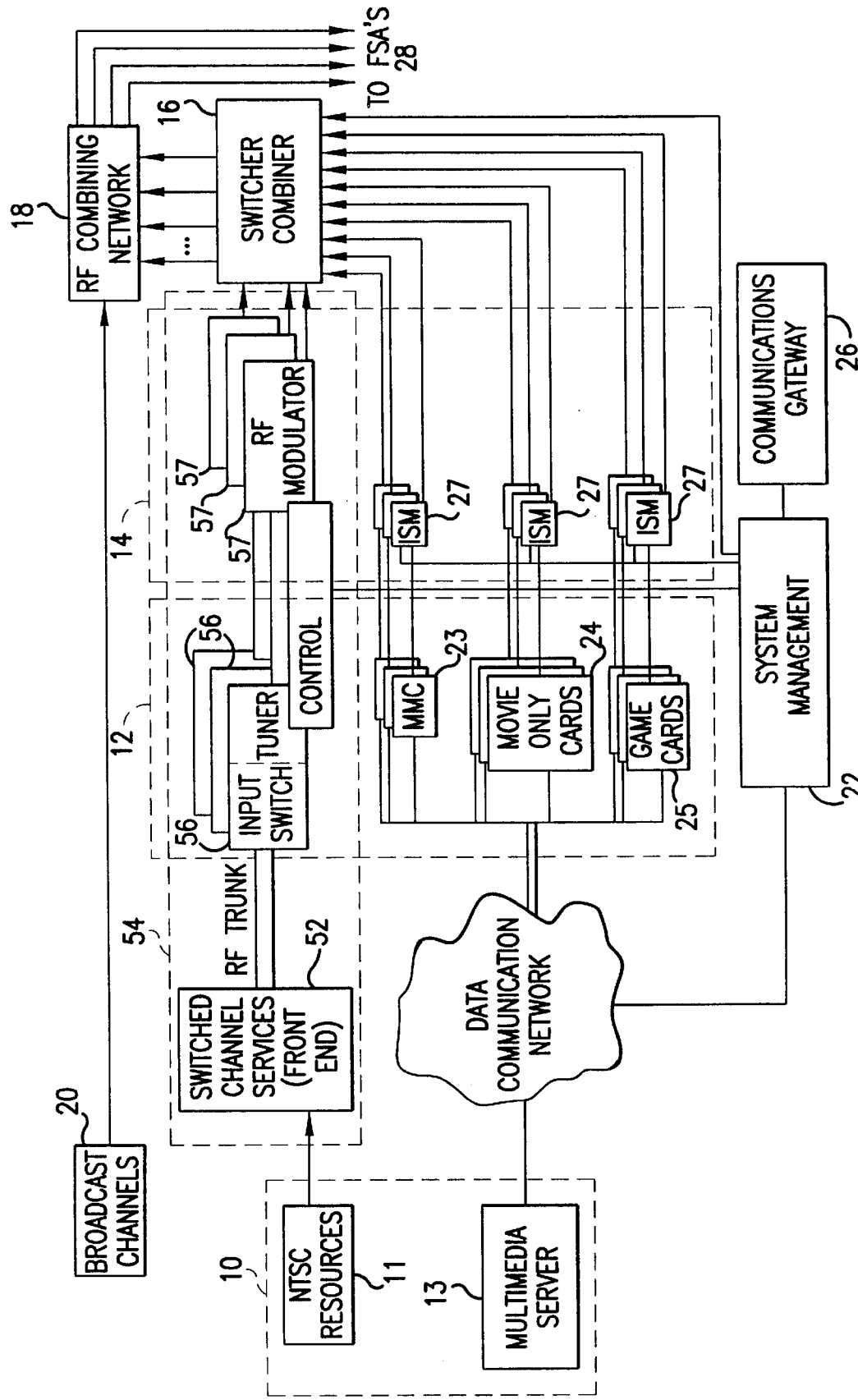
FIG. 1 is a schematic of an interactive television information system in accordance with a preferred embodiment of the present invention.

Referring now to FIG. 1, a cable television system is shown in which interactive television service is made available in accordance with an embodiment of the present invention. The cable provider uses cable rf combiners 18 to combine conventional broadcast channels 20 with interactive television service. The available bandwidth of the transmission cables, in accordance with an embodiment of the invention, are divided into two separate bands, one which carries the broadcast channels to all cable subscribers and the second band for carrying the interactive television service. Those subscribers requesting an interactive channel at a particular time will be assigned to a particular interactive channel from among those available in the band. The interactive carrier frequency assignment is performed by the system manager 22.

The entire subscriber pool serviced by the interactive system controlled by the system manager 22 is divided into a plurality of service areas. Each service area is served by a transmission line which may be a fiber optic cable, a coaxial cable or other transmission service. Hence the service areas are sometimes referred to herein as FSA's (fiber service areas). Each service area thus tends to be geographically distinct from the other service areas. Each service area provides cable television service to a defined subset of the subscriber pool. The broadcast band transmitted over each of the service areas of the cable system provide the same television information signals. The same broadcast channels 20 are thus provided to all subscribers in the subscriber pool. Interactive television service is generally individual to the particular requesting subscriber. Although, there may be instances where an interactive service can be shared by more than one subscriber such as in the case of near-video-on-demand where more than one subscriber is requesting a movie that begins at the same time.

Interactive service is addressed to a particular subscriber by identifying an interactive carrier frequency and a particular service area. An identical carrier frequency on a different service area may serve an entirely different subscriber with a different interactive information service. To illustrate, assume that channels 2–70 are conventional cable broadcast channels and that channels 71–90 are used for interactive television service. The television information signals provided over channels 2–70 will be the same for all of the service areas. Channels 71–90 are used to satisfy the requests of subscribers wishing interactive television service. If there are five requestors seeking interactive service in service area 1, they may be getting their interactive service individually over channels 71–75. In service area 2, there may be a dozen subscribers requesting interactive service and they may be receiving their service over channels 71–73, 78–82 and 87–90. While the identical carriers 71–73 are both providing service in service area 1 and service area 2, generally the television information signals being provided on identical carriers in different service areas will be entirely different. On the other hand, it is possible that a subscriber in service area 1 and a subscriber in service area 2 are both requesting to see a particular movie that begins at 8 p.m. from the near-video-on-demand information source. The system could provide this movie over channel 73 and deliver channel 73 with this same information service to service area 1 and service area 2. The system may be programmed to take advantage of this economy by sharing a selection element and an rf processor with the two subscribers requesting the identical television information signal. This would require limiting interaction with the subscribers while the movie plays.

In the situation where there are 20 interactive NTSC channels in each service area, there would be a limit of 20 requesting subscribers from any service area to receive interactive information service at the same time. Additional subscribers may be served in the instances where two or more subscribers in one service area are requesting an identical service so that one channel may be shared by more than one subscriber. The number of subscribers that may receive interactive service in a service area may be further expanded by digital compression. A channel can carry several compressed digital data streams. In such cases, a television information signal is addressed to a subscriber by identifying the particular data stream on a channel in addition to identifying the channel on the subscriber's service area.

Referring now to the interactive television service provider, a wide variety of interactive information sources 10 may be made available to the system. Such sources may include a wide variety of satellite received television information signals, memory devices accessible through a multimedia server 13 and interactive players, such as video cassette recorders or laser disc players. The information services may include games, digitally recorded movies, movies on tape, catalogs, etc. A variety of video providers 12 interact with the information sources in response to interactive communications from the subscriber. The information service is provided on the subscriber's assigned channel by the rf processing units 14. The carrier frequency from the rf processing unit must be sent out to the appropriate fiber service area. Applying the television information signal to the selected service area is performed in the switcher-combiner 16. Some of the video providers are fixedly assigned to a particular service area. For these video providers, control of switches is not needed within the switcher combiner. For those video providers not permanently assigned to a service area, service area switches in the switcher combiner 16 are controlled by the system manager 22 to direct the signal to the currently assigned service area. The various carrier signals for each service area are all combined in the switcher-combiner 16 for transmission over a separate cable 28 for each service area. The broadcast band of channels 20 is combined in the rf combining network 18 with the interactive channels for each service area.

Satellite signals and near-video-on-demand are NTSC sources 11 that can be handled by a plurality of selection elements in a switched channel system 54. Near-video-on-demand is a collection of programs, such as movies, playing at predetermined intervals, such as every 15 minutes. A switched channel system is described in greater detail in an application entitled "Switched Channel System" invented by W. Leo Hoarty assigned to the same assignee herewith and filed Jun. 8, 1995 bearing Ser. No. 60/000,017. The disclosure of this co-pending application is hereby incorporated by reference herein. The switched channel system front end 52 puts the input signals each on a different preassigned rf carrier from a plurality of rf carriers. The rf carriers may be carried on one or more cables. The presently preferred embodiment provides three cables. Each cable may have a 750 MHz bandwidth for carrying 104 carrier frequencies each with its own television information signal. At the output end of the switched channel system, selection elements 56 may tune into any of the signals on any of the cables. The desired television information signal is converted to the assigned 6 MHz carrier of a requesting subscriber by an rf modulator 57 associated with the selection element 56. The selection elements 56 and rf modulators 57 are controlled by the system manager 22. The switched channel system 54 is suitable for information services which do not involve interactivity above and beyond the selection of the desired program.

Each selection element 56 of the switched channel system includes an input switch and a tuner and is associated with an rf modulator 57. The input switch selects the one of the three cables on which the desired signal can be found. The tuner selects the carrier frequency of the desired signal. The rf modulator 57 puts the desired television information signal on the television frequency assigned to the requesting subscriber.

It is an FCC requirement for cable television systems that the signal strength of adjacent channels made available to a subscriber not vary by more than 2 dB. Therefore, a gain control is required to provide the desired signal strength for any switched channel placed on the output cable. Automatic gain control is made difficult in the switched channel system because the signals are scrambled. The scrambled signals have their sync signal suppressed. For conventional or automatic gain control to operate, the peak-to-peak amplitude of the signal including the sync signal is required. Preferably, the scrambled signal need not be completely descrambled. Sync is restored to the scrambled signal only for the purpose of performing automatic gain control. The scrambled signal is switched by the switched channel system and delivered at proper gain.

In order to perform automatic gain control in the selection elements, the sync signal must be restored. However, to avoid a need for rescrambling the signal, the restoration of the sync signal may be performed only for automatic gain control of the original scrambled signal which is preserved in parallel with the automatic gain control operation. The sync signal may be restored by any of a variety of methods including use of the vertical blanking signal or use of color burst. The sync restored signal is used for automatic gain control of the scrambled television information signal. The gain controlled television information signal is modulated at the subscriber's assigned frequency.

The source of more intensively interactive programming may be provided by computers. Server 13 streams may provide such interactive programming as games, catalogs, interactive stories or movies, etc. These interactive server streams are controlled and delivered to requesting subscribers by interactive elements. Interactive elements may be any of a number of processors, including multimedia cards 23, movie only cards 24, game cards 25 etc. The interactive elements are individually assignable to a requesting subscriber. The system manager 22 assigns an interactive element to a requesting subscriber who has requested the use of one of the server streams. The interactive element directs the interactive information service through an integrated scrambler modulator unit 27 where it is placed on the carrier frequency assigned to the requesting subscriber. In the presently preferred embodiment, each interactive element is connected to an associated integrated scrambler and modulator 27. The system manager 22 may be arranged so that communications between the requesting subscriber and the interactive element may proceed directly with one another once the assignment of the interactive element has been made. The interactive element can forward commands from the subscriber to the multimedia server 13, if necessary, so as to interactively control the interactive information service. An interactive element with multimedia capability permits screen overlays to be added on top of the program provided through the server stream. A game card interactive element is fully equipped by itself to create and manipulate the screen display.

There need not be sufficient interactive elements to handle every subscriber in the subscriber pool. Only a small fraction of all subscribers will be using an interactive service at any given time. Therefore, the number of interactive elements may be determined to handle the peak usage with an acceptable degree of contention. Minimizing the number of interactive elements in a system significantly reduces overall system cost.

In the telephony field, the well known engineer and mathematician, Erlang, created numerical tables in the 1920's to establish the level of overhead needed for a given quality of service (level of availability of telephone lines, for instance). The tables were derived from a well known statistical property known as the Poisson distribution. The tables are in use today and provide the service overhead needed for a given blocking factor, known as Erlangs, for a given size of average peak users. The most important aspect of these tables is they show that the smaller the number of simultaneous users, then the larger the percentage of extra circuits needed to provide the same level of service (blocking factor). This is because of the fact that the smaller the population of users becomes, then the more unpredictable their behavior becomes and the more system elements are needed to compensate for this more unpredictable behavior. The Erlang model teaches that ten cities with one hundred telephones each will, in total, require more telephone switching elements than one city of a thousand telephones.

The Erlang model is derived from the Poisson distribution model where the Poisson model is generalized for estimating the level of random behavior relative to sample population size. The general characteristic of these models is the inverse, exponential relationship of random behavior to size of measured population. The smaller the population, the exponentially more is the level of unpredictable behavior. As is typical of exponential models, the curve flattens after a certain value where further increases in population result in very small changes in random behavior. It is of this characteristic that the invention takes advantage. For instance, assuming no switching is present, then one must treat each fiber service area of a broadband system as an individual and isolated system. Within a population of interactive television users within one fiber service area, there may be twenty average peak simultaneous users from a subscriber base of two hundred interactive television service enabled subscribers (and those two hundred interactive subscribers come from the total population of five hundred basic cable subscribers of that individual fiber service area.)

Figure 2:
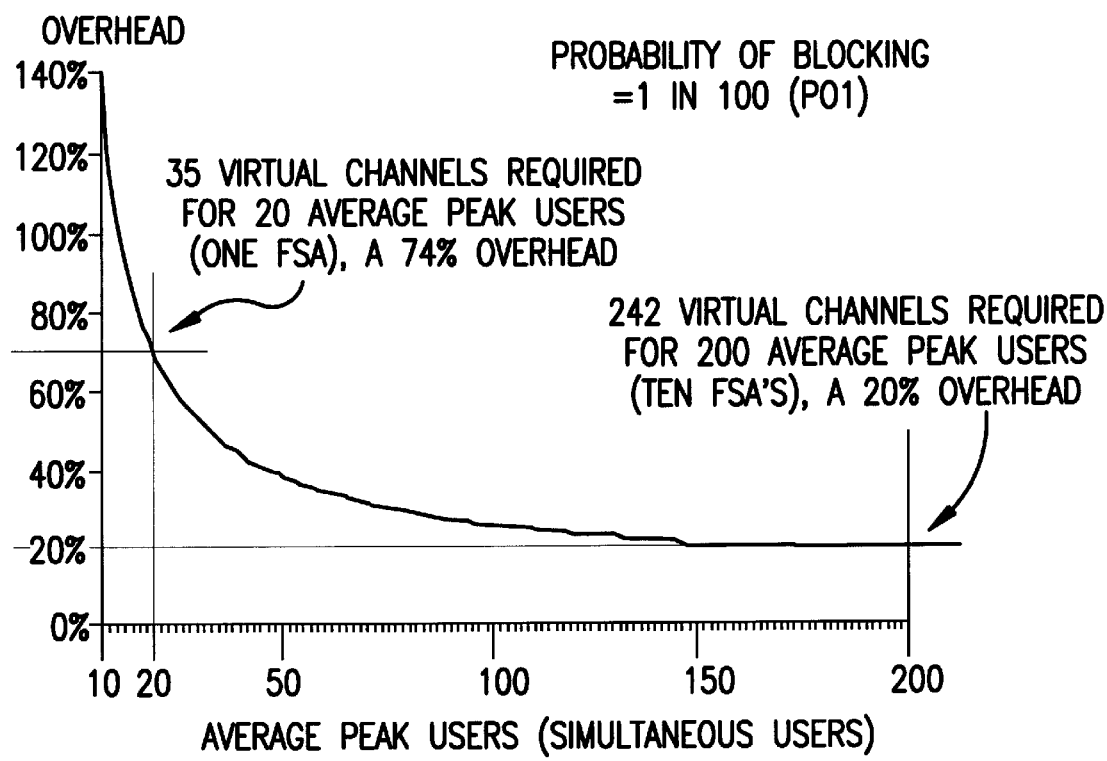
FIG. 2 is a graph illustrating the concept of "law of large number" overhead.

Using the Poisson table in FIG. 2, the twenty average peak simultaneous users within the fiber service area require twenty television channels and twenty interactive processors within the headend plus an additional 74% or 15 more television channels and interactive processor to establish a service level of one percent blocking (called P01 level of service in the telephone industry) meaning an average user will experience one busy signal for each one hundred tries, on the average. If one could apply switching over a group of fiber services areas, for example, switching over five service areas, then the total population of average peak simultaneous users would equal 100 users. This aggregated population would require an overhead (additional capacity) of 27%, 27 more channels, to realize the same P01 level of blocking. Further switching to ten fiber service areas would create an average peak user base of 200 simultaneous users. These 200 simultaneous users would require an overhead of 21% additional capacity to have the same P01 level of service, equal to 42 additional channels. Beyond ten FSA's (200 simultaneous users) the curve flattens around 20% additional capacity for any increase in population.

Not all interactive service elements need to be switchable over the group of FSAs, a certain number of interactive elements can be fixed to serve a dedicated fiber service area. One needs only to switch a little more than the difference between the overhead requirement of the single service area and the average peak usage per FSA calculated across the entire group. By spreading the use of some but not necessarily all of the interactive elements over the larger subscriber pool rather than dedicating each controller to a particular service area, the number of required interactive elements is reduced because variation from average peak is percentage-wise smaller for a larger pool than for a smaller pool of subscribers.

Figure 3:
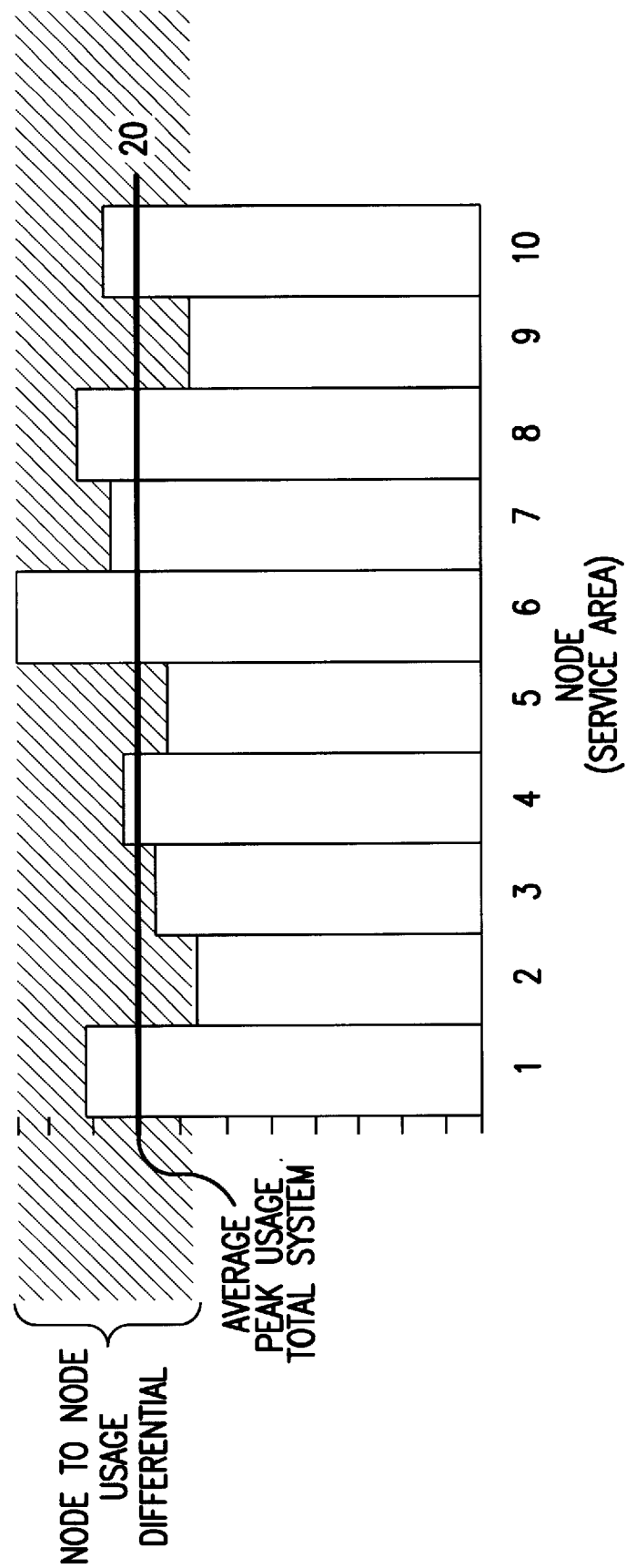
FIG. 3 is a graphic illustration of the variable peak usage over a plurality of service areas.

FIG. 3 illustrates 10 nodes, the total system having an average peak usage of 20 simultaneous users per node (service area). Assuming each service area has approximately an average peak usage of 20 simultaneous users, to meet the overhead for reducing the probability of blockage in any of the service areas to one in a hundred, 35 interactive channels will be provided over the cable to each service area. This may require 35 channels or 16 analog channels and four channels carrying five digitally compressed information signals. Other combinations are of course also possible within the scope of the invention for providing the required number of television information signals to a service area. It should be kept in mind that the actual calculations for any group of subscribers will depend on the usage rate for that group, the average length of any interactive usage and the usage characteristics surrounding the prime times. Considering the interactive service provider serving ten service areas with 35 interactive channels each, there should be no problem in terms of available bandwidth to meet the average peak requirements of the entire subscriber pool. In fact, the 350 interactive channels is more than enough. Furthermore, there is no economic need for 350 MMC's at the node. It should be sufficient to provide the node with 242 interactive elements 12. Considering that some of the interactive usage will be taken by the switched channel system, the number of interactive elements 12 can be substantially less than 242. This is made possible by the use of frequency agile modulators and the rf switch of the present invention, which enable the entire subscriber pool to share the interactive elements 12.

In FIG. 2, it is shown for a system in which there are 20 average peak users per service area, a night in which an unexpectedly high usage rate is found across the system, there are 242 users across the whole system. This simultaneous event in accordance with the calculations for this system would only happen one in a hundred times. Even for this extremely high usage rate, the use of the switcher-combiner and frequency agile modulators makes possible the economical system in which there are no more than 242 interactive elements. In the diagram of FIG. 3, the additional simultaneous users in service area 6 can be serviced by any of the switched interactive elements 12 in the system. By sharing the interactive elements system-wide, the lower overhead characteristic of a larger subscriber pool permits the system to operate with an economical number of interactive elements and frequency agile modulators.

It is further seen that the graph of FIG. 2 is asymptotic such that spreading the distribution over an entire city does not change the overhead percentage in any tangible manner. Therefore, once a system is designed for a subscriber pool on the asymptote of the curve, there is no advantage to further servicing more subscribers on the same node. Thus, an entire city may be served by dividing the city into a number of nodes each with a sufficient subscriber pool to land on the asymptote of the Poisson distribution.

It is recommended that each of the service areas be divided up such that they all have roughly similar average peak simultaneous users. The size of a service area should be governed by the available interactive bandwidth on a fiber optic cable. The service area size is thus governed by the available interactive cable bandwidth. The number of service areas accommodated by a single interactive cable node should be determined by the asymptote of the Poisson distribution for the system. Once the asymptote has been reached, it is not necessary to continue adding to the system. It may make economic sense at that point to build another cable node to service additional service areas. While the initial node can continue to be expanded, it may be possible to reduce the cabling requirements by building a second node closer to additional service areas and creating a second subscriber pool.

Figure 4:
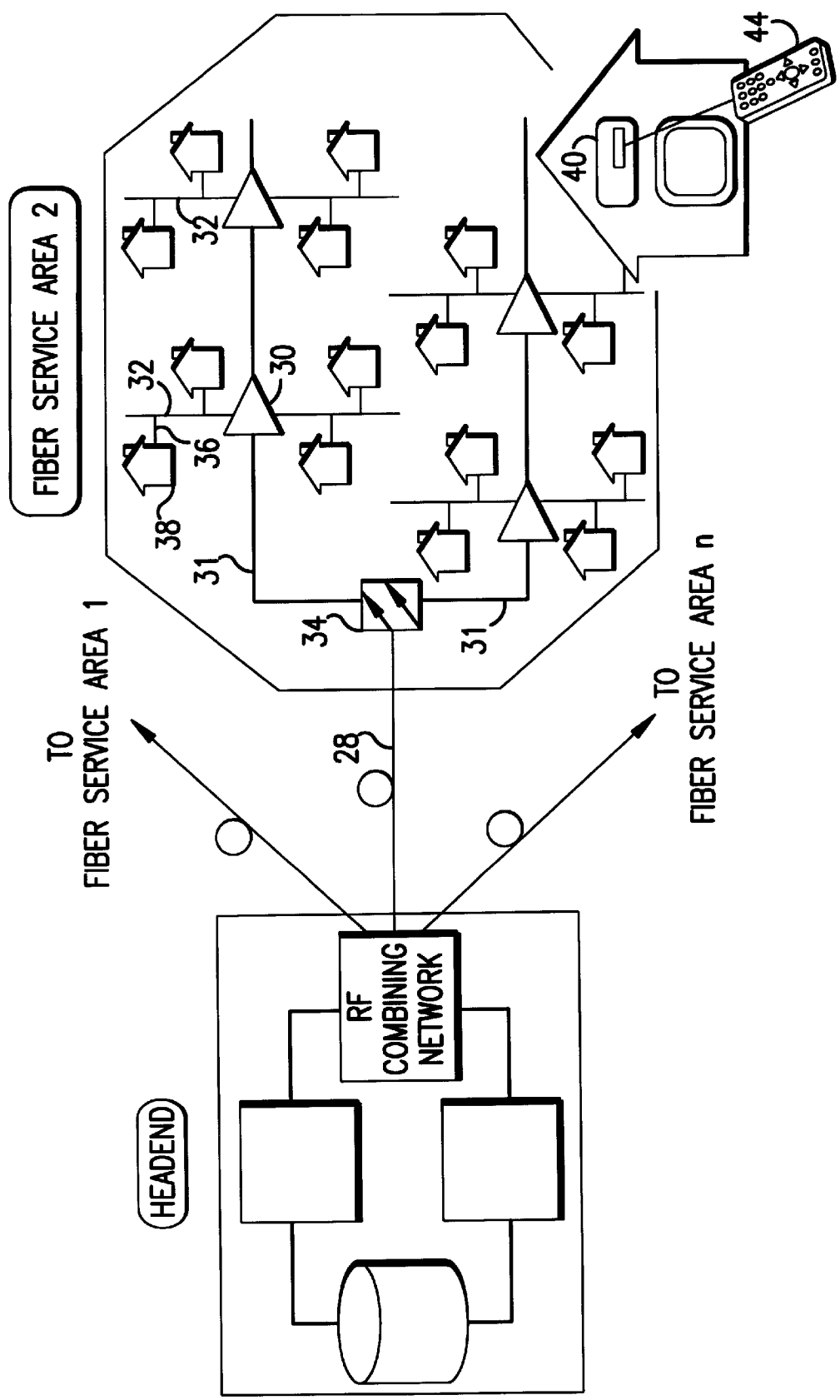
FIG. 4 is a schematic showing the cable distribution plant to a plurality of fiber service areas

A service area is typically fed by an optical fiber 28. Referring now to FIG. 4, the signals on the fiber 28 are received in an optical receiver 34. Express cable trunks 31 distribute the signals throughout the neighborhoods of the service area. Bridger amplifiers 30 boost the signals for travel down feeder cables 32 along each street of subscribers. Cable drops 36 connect subscriber homes 38 to their respective feeder 32. Each home is provided with a television set-top 40. In accordance with the present invention, a conventional cable converter set-top 40 is sufficient to receive interactive television service. However, as television distribution changes over the years, it may become desirable to provide homes with a digital set-top or digital set-top with a multimedia processor. Preferably, each set-top is provided with a home interface controller 42. The home interface controller 42 has the capability of communicating back and forth with the system manager at the broadband provider. A separate band may be provided over the cable network for such communications. Such communications can be time division multiplexed on a communication frequency to provide sufficient carrying capacity for communications with the entire subscriber pool. Alternatively, or in addition, a communication band may be provided permitting the use of frequency multiplexing of communications. The broadband provider includes an interactive and communications gateway 26 for handling such communications between the home interface controllers 42 and the system manager 22. Instead of a home interface controller communicating on the cable network, a system of the present invention may use a separate communication link such as a telephone line for communicating between the subscriber and the system manager 22.

The home interface controller 42 requests interactive service upon an interactive channel selection by the user. The system manager 22 will assign a carrier frequency to the requesting subscriber at the home interface controller 42. The home interface controller 42 is informed of the assigned carrier frequency and tunes the television set-top 40 to the assigned channel. Two-way interactive communications can continue between the home interface controller and the assigned interactive element.

Each of the home interface controllers is associated with a channel selector, typically a remote control 44 operable by the user. In accordance with the invention of co-pending application Ser. No. 08/333,957 filed Nov. 3, 1994, the entire disclosure of which is hereby incorporated by reference herein, the remote control 44 has a channel selector for picking a channel number from a single numerical sequence of channel numbers. To illustrate, channels 2–70 may refer to the conventional broadcast channels. Channels 71–300 may refer to available interactive information services. For the conventional broadcast cable television service, the channel on the remote control corresponds to the channel delivered over the cable. However, for the interactive information services, the channel on the remote control identifies a particular service so that the cable provider can deliver the requested interactive information service to the requesting subscriber. The selected interactive information service is provided to the service area of the subscriber over the interactive channel assigned to that subscriber by the system manager 22. This will be one of the channels in the interactive band which may include only channels 71–90 for example. The assigned channel normally has no relation to the interactive channel selected by the user. The home interface controller 42 controls the tuning frequency for the set-top when the channel selector is in the interactive channel range.

The multimedia card 23 is one type of interactive element that may be made available. A multimedia card contains multimedia processor elements (CPU and RAM), graphics and display support elements, and appropriate software to create a generally programmable, interactive device with text, color image, sound and full motion video processing. Individual users interact with various multimedia computer programs that are loaded, on-demand, into the card's processing memory for at least the duration of the user session. Thus multimedia cards may be employed for movies only 24 (providing for example, decompression of stored digitally compressed movies in MPEG format), for providing multimedia presentations using software utilizing the Intel 486 processor or the Intel Pentium Microprocessor, or using 3DO or SGI formats. When digital information sources are provided, digital interactive elements having digital encoders may be employed. Digital interactive elements as well as various communication cards including some which permit interactive overlays on broadcast programming and permitting subscribers in two or more homes to communicate interactively in a computer game and gateway cards are also provided.

Figure 5:
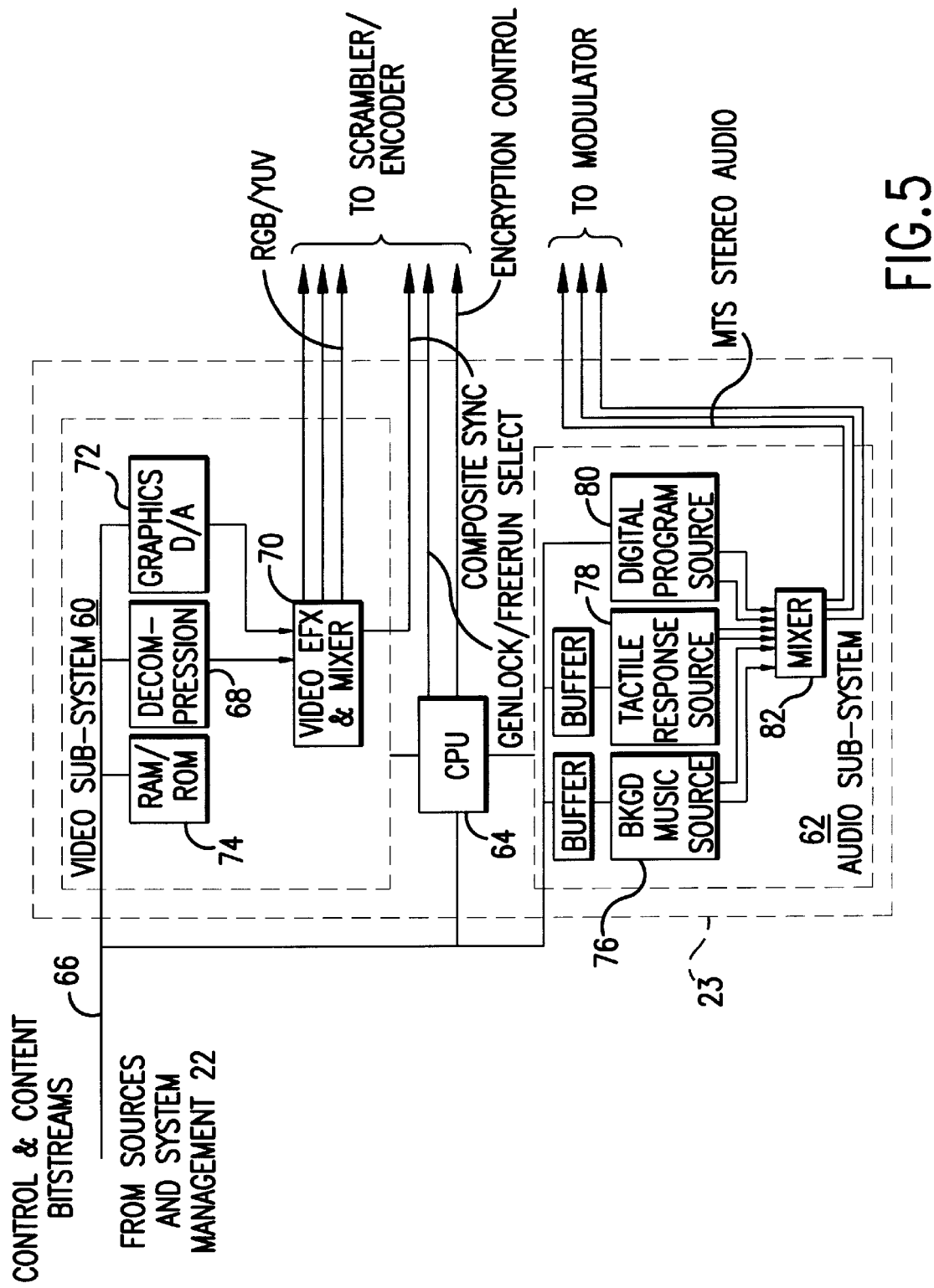
FIG. 5 is a schematic of an analog multimedia processor type of interactive element.

FIG. 5 illustrates the structure of an analog multimedia card 23 that may be used as an interactive element. The multimedia card includes a video sub-system 60 and audio sub-system 62 operating under control of CPU 64 and control line 66 from the system manager 22. Line 66 also is in communication with sources 10 of information services, which receive decompression by block 68 and are mixed in the video effects and mixer module 70. Line 66 also carries messages from the home interface controllers. Messages from the home interface controller assigned to a particular multimedia card are specifically addressed to that multimedia card. The module 70 also receives input from graphics digital-to-analog converter 72 (providing, among other things, display for subscriber interaction) utilizing data from RAM/ROM storage 74 and control/content bitstream data obtained over line 66. The RGB/YUV output of the module 70 is provided to an associated integrated scrambler modulator 27. The module 70 also receives a composite sync signal input from a scrambler/encoder in rf processing 14 for use in providing a system timing reference to the video overlay.

The audio sub-system 62 in FIG. 5 includes a background music source 76, tactile response source 78 (for use in connection with the subscriber's remote control 44 in interactive television service), and digital program source 80, which obtain control and content data over line 66. These sources all feed a mixer 82. MTS stereo audio output of the mixer 82 is then provided to the integrated scrambler modulator 27.

Figure 6:
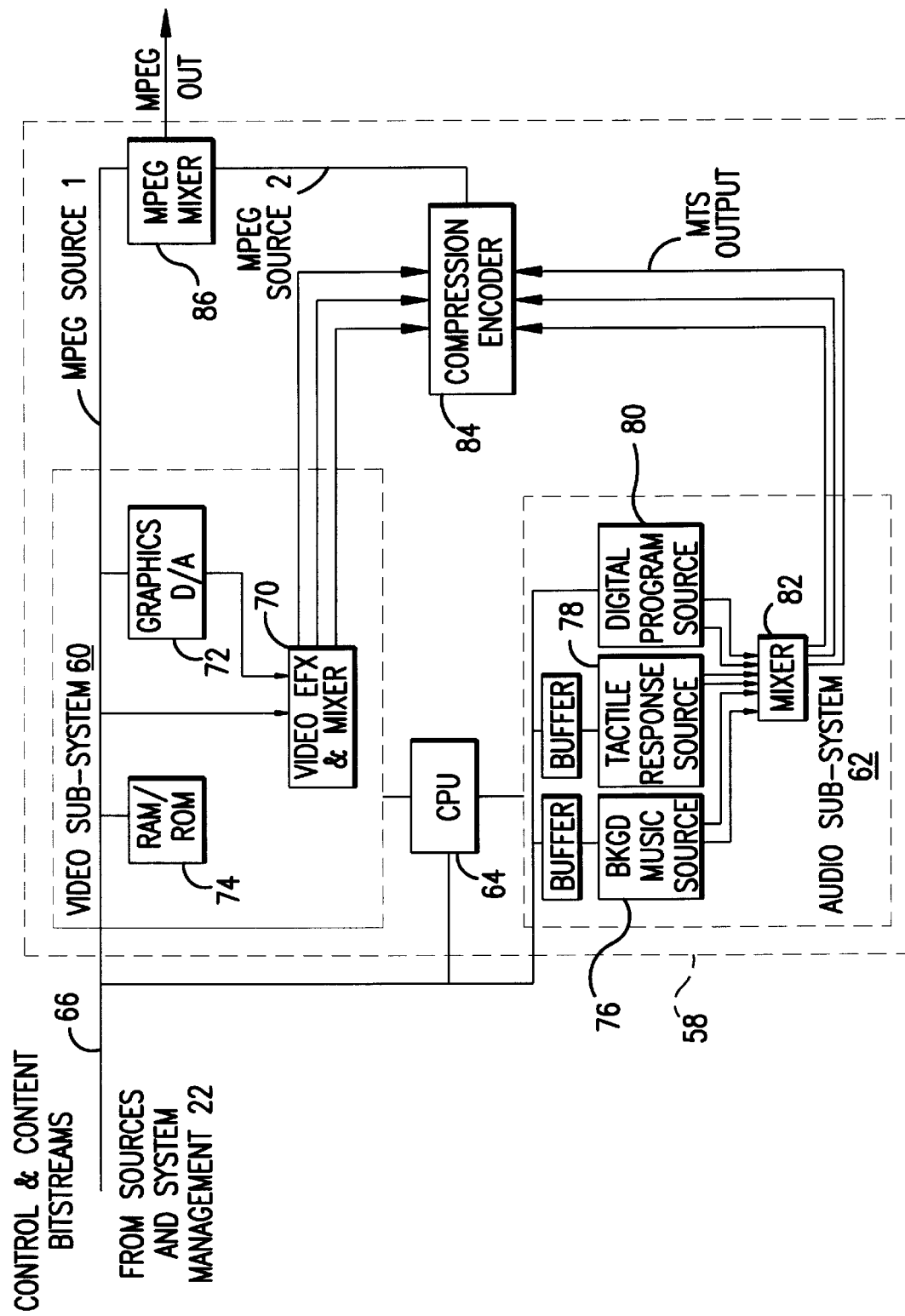
FIG. 6 is a schematic of a digital multimedia processor type of interactive element employing MPEG mixing technology.

The structure of a digital multimedia card 58 shown in FIG. 6 is similar to that of the analog MMC cards. A television signal and output of a graphics digital-to-analog converter 72 are mixed in the video effects and mixer module 70. Instead of decompressing the digital video source before feeding it to the mixer module 70, however, the compression here is maintained and sent directly to MPEG mixer 86 as MPEG source 1. The analog output of mixer 70 is compressed by MPEG compression encoder 84, which also receives the MTS audio output. The output of the compression encoder 84 serves as source 2 input to MPEG mixer 86. The output of the MPEG mixer is digital television in the CCIR 601 format of YUV signals (4:2:2=to 8 bits per picture element). This MPEG output is then sent to an encoder. The MPEG datastream is typically combined with other (typically four other) MPEG streams to then drive a 64 QAM or 16 VSB modem that then is modulated onto an RF carrier to be sent out over the system. The MPEG mixing in block 86 is achieved by recognizing that the graphics overlay data from digital-to-analog converter 72 provides video content that does not change rapidly, and therefore can be implemented by causing the mixer to affect only the I-frame picture elements in the MPEG compression scheme with respect to the overlay content. (MPEG's compression scheme is described in "C-Cube CL450 Development Kit User's Guide," dated Dec. 14, 1992, Chapter 2, available from C-Cube Microsystems, Milpitas, Calif., which is hereby incorporated herein by reference.) The MPEG mixer 86 includes an arrangement for providing the source 1 MPEG-encoded digital signal to a buffer; an arrangement for extracting from the source 2 digital signal I-frame picture elements to be over-laid; and an arrangement for overlaying the I-frame picture elements from the source 2 digital signal onto the corresponding regions of the I-pictures of the source 1 digital signal. The other picture types of the source 2 signal are not permitted by the mixer to modify portions of the I-picture that have resulted from the mixing. Further discussion of compressed video overlay control can be found in commonly assigned co-pending U.S. application Ser. No. 08/250,723, filed May 27, 1994, the entire disclosure of which is hereby incorporated by reference herein.

Figure 7:
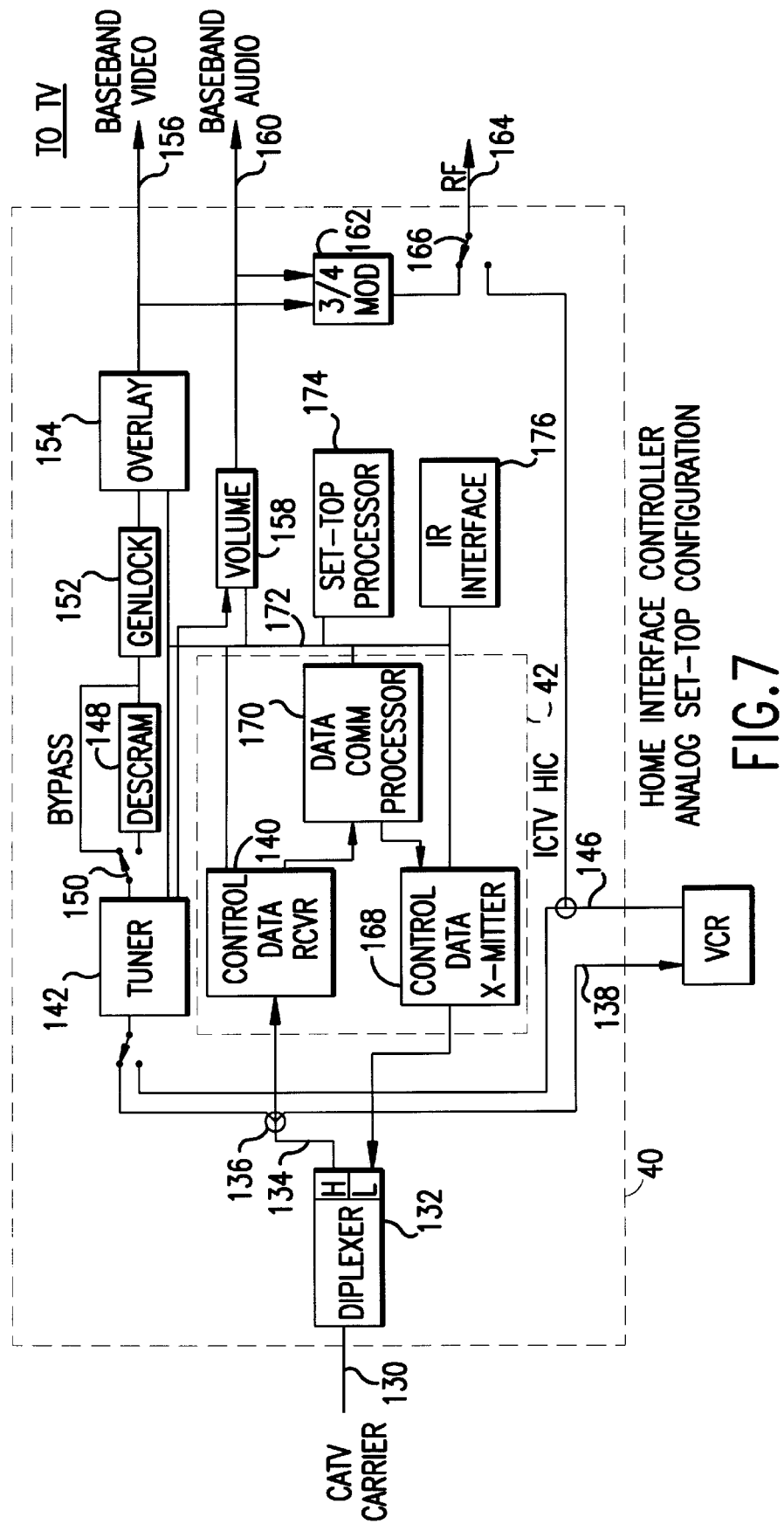
FIG. 7 is a schematic of a home interface controller and analog set-top for use in the system of FIG. 1.

FIG. 7 illustrates an embodiment of an analog set-top. the rf cable television input 130 feeds diplex filter 132, the high pass section of which feeds television information signals and downstream data to line 134 and splitter 136 for division among VCR rf input at 138, control data receiver 140 and tuner 142. The low pass section receives upstream data communications from control data transmitter over line 144. Tuner 142 is switched between VCR rf output 146 and the television information signals from line 134. The tuner's output is fed to descrambler 148, which is bypassed by switch 150. Genlock block 152 provides sync signals necessary for permitting overlay controller 154 to function properly with the tuner output. The overlay controller's output is fed directly to baseband video output 156, and the tuner's audio output is routed through volume control 158 to baseband audio output 160. A channel 3/channel 4 modulator 162 coupled to these baseband outputs provides rf output over line 164 to the subscriber television. Switch 166 switches the television between the set-top's television information signals and the VCR's rf output. Home interface controller data communications involving the data receiver 140 and the transmitter 168 is handled by data communications processor 170, and the information flow is via data bus 172 to and from set-top processor 174, infra red interface 176 for the remote control 44, overlay controller 154, tuner 142 and volume control (setting) 158.

Figure 8:
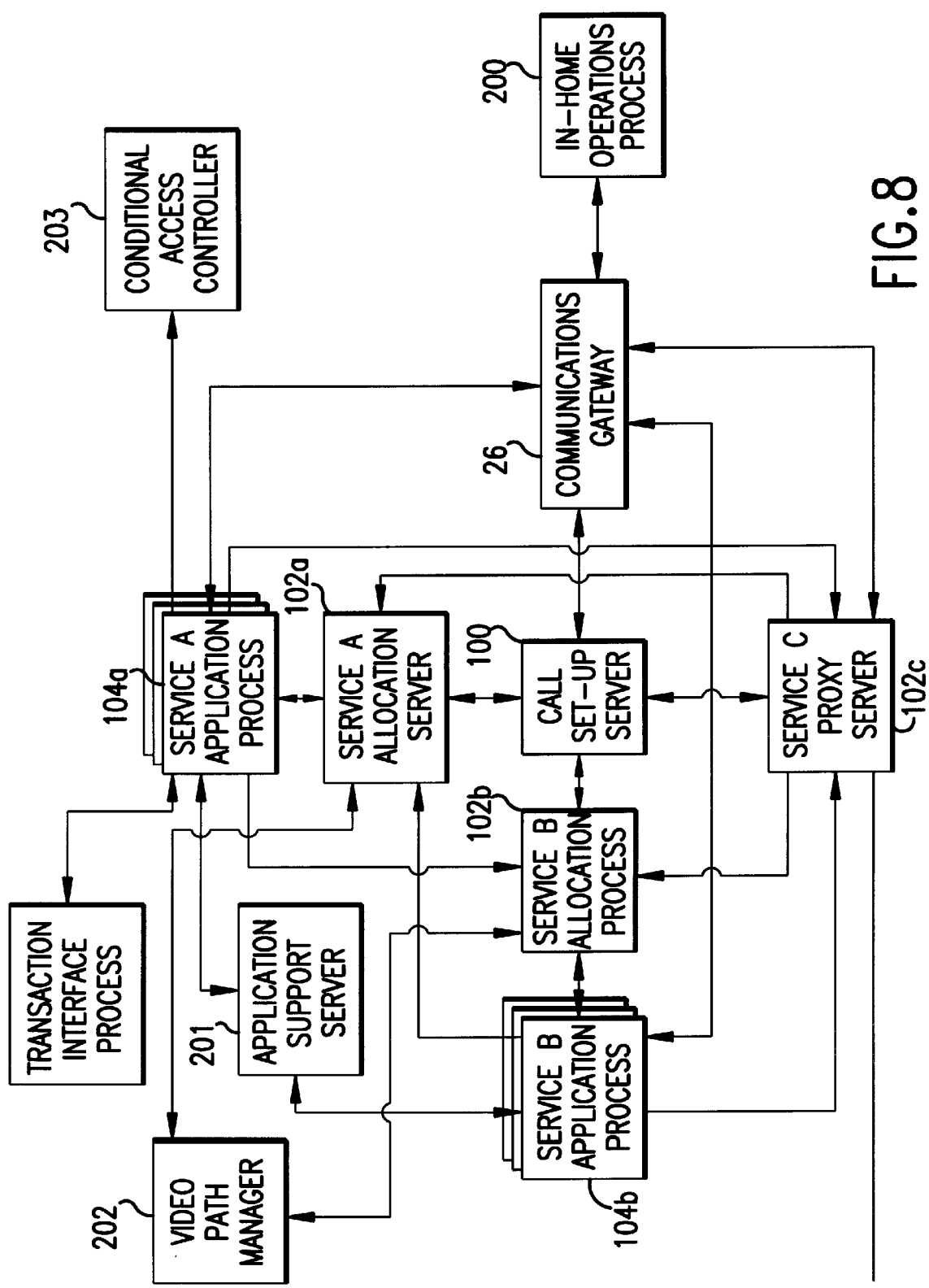
FIG. 8 is a schematic showing an embodiment of the system management and communications I/O of the system of FIG. 1.

The system management of the presently preferred embodiment shall now be described in greater detail with respect to FIG. 8. In accordance with the preferred embodiment of FIG. 8, the processing resources of system management are advantageously distributed and allocated for efficient use with respect to subscriber requests for interactive television service. Communications between home interface controllers and system management are all conducted through the communications I/O 26.

The system manager 22 is responsible for two functions: (1) is call set-up and tear down and (2) is resource allocation within the interactive TV system. Call set-up is the process of assigning a television information signal from the home to the cable television headend and resource allocation is the process of assigning appropriate line cards and virtual circuits within the switching system in the headend.

Call set-up is initiated by a small program in the home interface controller 42 which keeps track of the channel the user is watching. The channels are broken into bands where, for instance, channels two through 70 are assigned regular TV programming both off-air TV channels as well as cable channels such as MTV, HBO, CNN, etc. The band above this broadcast band uses channels 71 to 90, for instance, for interactive services where a user is assigned one of these channels only during the duration of that user's interaction with the interactive TV system (i.e.—while looking up a restaurant in the entertainment guide, or while watching a movie, etc.). A user may tune from a broadcast channel (e.g.—ch. 37 CNN) to an interactive service virtual channel (e.g.—ch. 71 for the Movie Guide or ch. 307 for an infomercial). When the user tunes out of the broadcast channel to any channel number designated for interactive service, the small program in the home interface controller sends a signal to the system manager at the headend to initiate call set-up.

The system manager 22 in the headend begins the call set-up process through a system manager subsystem called the call setup server (CSS) 100. The CSS 100 finds a free interactive element or selection element corresponding to the virtual channel number the user is trying to tune to. As an example, assume the user is interested in movie previews which are viewed through interacting with a multimedia processor and a program run on service "A" application process 104a. The CSS 100 will call a video path manager subroutine to check for an available television information channel within the band of television information signals allocated to provide interactive service to the neighborhood of the requesting user. The newly assigned television information signal of the requesting user and the user's network address is passed to a service allocation server (SAS) 102a associated with the application process.

Assuming a non-blocked call, the system management function has now passed from the CSS 100 sub-system to the SAS 102a (for this example). The CSS 100 is now out of the loop. The SAS 102a checks for a free resource, i.e., a processor for running a service application process. If one is available, control is passed to it along with the assigned television information signal and address of the calling user. The processor, in this example, is a multimedia card (MMC) 23. The service application process run by MMC 23 sends a request to the application support server 201 for subscriber information to authenticate the user id for the neighborhood from which the signal is originating. The service application process also requests subscriber information from the application support server 201 customer database to check for paid up service and/or access to service permission (e.g.— used to block children from viewing R rated movie previews, for one example). Upon success, the service application process directs the conditional access controller (CAC) 203 to send a descramble key code to the user's set-top converter to allow it to descramble the video signal that the service application process will be using. The service application process also communicates directly with the set-top in-home operations process (IHOP) 200, informing the program of the assigned television information signal. The home interface controller operates the in-home operations process. A separate processor in the set-top receives the descrambling keys and translates them.

The set-top IHOP 200, upon receiving the assigned channel, tunes the cable TV set-top to the assigned channel. The user will see the output of the SPU card and can begin using the remote control to manipulate the program running on the SPU 104a. The in home operation process 200 transmits appropriate remote control commands addressed to the SPU assigned to it. When the user tunes to a broadcast TV channel the call take down process is initiated by the set-top system manager extension signaling the SPU 104a that the user has tuned away, and, after a time-out period (for instance, five minutes), the SPU 104a signals the call setup server 100 to release the interactive virtual channel previously assigned. The virtual channel is logged back into the free channels list by the CSS 100. At the same time, the SPU signals the SAS 102a that it is now a free resource and the SAS places the SPU on its free card list.

The example above is the same for MMC's 23 for interactive multimedia as for selection elements 56 for remote satellite programming applications as for MPEG2 movie only decoder cards 24 for movie viewing. Further, the MMC can be used for a front end application such as movie previewing and purchasing. When the user picks a movie using the MMC, the MMC will then pass control of the user to a control program that manages movie playback and decompression (MPEG2 to NTSC). When the movie is over, the movie playback control program follows the same steps of call take down as the MMC did.

The above system management scheme can accommodate any number of diverse services in a fully distributed manner such that there are no bottlenecks in the system. This affords optimal performance in response to user requests. By distributing the processing of communications with home interface controllers throughout system management, a greater amount of processing can be conducted in less time with less expensive processing units.

System management may include separate service allocation servers 102 for each of the switched channel system, the digital interactive elements, and the analog interactive elements. Moreover, there may be additional service allocation servers 102 further dividing the interactive elements into groups according to the type of interactive service provided. Thus, there may be a service allocation server for movies only, for games, and for catalogs. The service allocation servers act as intermediaries between the call set-up server and the video provider elements whether they be selection elements 56, MMC's 23, movie only cards 24 or game cards 25. The service allocation servers provide distributed management. The call setup server 100 can pass the call set-up to the appropriate service allocation server. As the service allocation server identifies a video provider element and completes the connection with the home interface controller, the call set up server can be attending to the next caller.

The communications gateway 26 acts as a translator between the IHOP 200 and the headend LAN connecting the distributed processes of the system manager 22. The communications gateway 26 translates the IHOP address from an individual user into a global Internet Protocol (IP) address for addressing ethernet data packets within the headend LAN. IP is part of TCP/IP. Communications are directed from the communications gateway 26 to the application process directly. Once the service allocation server assigned to a home interface controller has put the home interface controller in communication with the requested application process, the communications can be handled directly. The control of the switched channel system is simple in that it is only necessary to put the requested information service on the assigned television information signal. The interactive elements require greater processing requirements as interactive communications continue throughout a session. System management is also required to maintain administrative tasks such as billing. Each of the service application processes is in communication with a transaction interface process so that billing and credit and other financial matters can be taken care of.

In accordance with a preferred embodiment, each interactive element is connected to an integrated scrambler and modulator 27 for rf processing. The scrambling function in general can either be provided in the rf processing or the interactive element. A system may be provided with an assortment of fixed frequency modulators and variable frequency modulators. The system manager will assign home interface controllers to interactive elements paying attention to the particular modulator connected to the interactive element. The scrambler scrambles the video signal from the interactive element and the modulator puts it on the assigned carrier frequency. Once the carrier frequency has been applied to the video signal, it is only necessary then to make sure the signal goes to the correct service area. If the interactive element and its modulator are fixedly assigned to a particular frequency and service area, the routing of the signal is complete. If the interactive element is connected to a variable modulator, the switcher-combiner 16 performs the function of routing the signal to the designated service area. The switcher-combiner 16 directs the signal from the modulator to the correct service area in response to control signals from the system manager 22. The switcher-combiner 16 may be designed so that a signal may be provided to more than one service area. This may be helpful in the case of near-video-on-demand where the same signal may be requested by a variety of subscribers from different service areas. All the carrier frequencies going to a given service area must be placed on the same cable. The switcher-combiner 16 also combines all the signals to be put on a single cable for a given service area.

Figure 9:
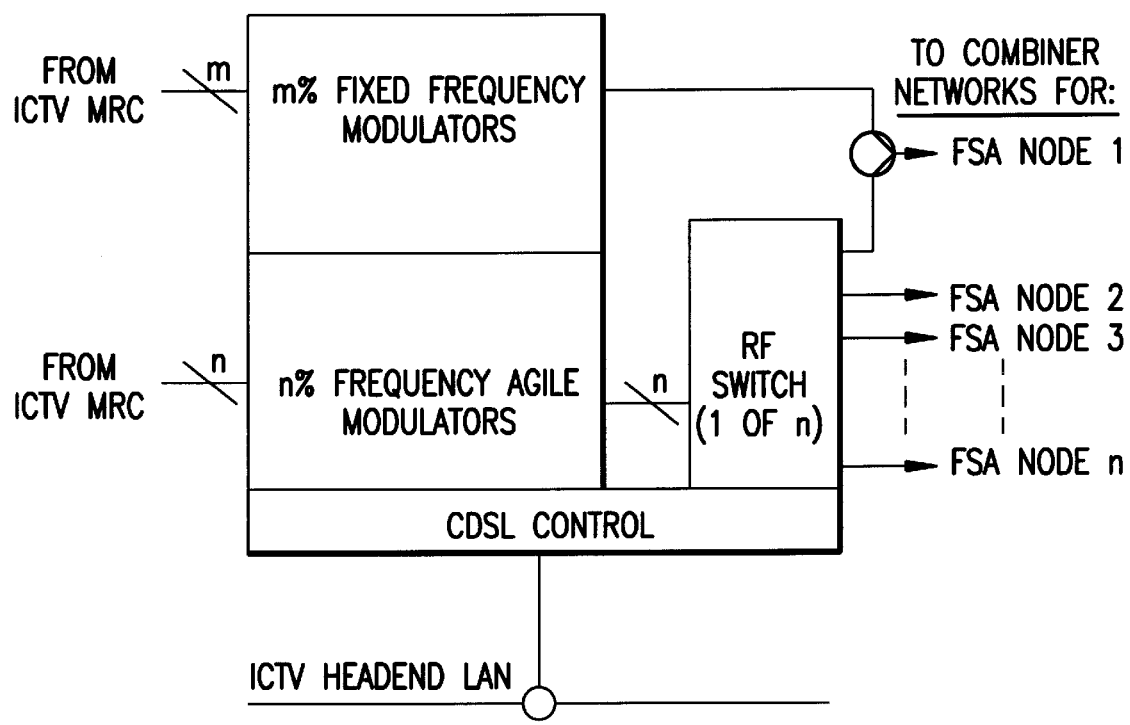
FIG. 9 is a schematic showing the use of fixed frequency and frequency agile modulators with and without switching in the system of FIG. 1.

Referring now to FIG. 9, the output switching arrangement of the interactive television system of the present invention is illustrated. The present invention advantageously reduces the component requirements of the interactive system. Fixed frequency modulators 180 are included in this system because of their reduced cost compared to frequency agile modulators. A portion of the interactive channels for each service area may be serviced by a fixed frequency modulator. Some of the fixed frequency modulators are in connection with an interactive element while a number of fixed frequency heterodyne processors may also provide an output from the switched channel services. The remaining portion of interactive elements are connected to frequency agile modulators 182. The switched channel services may also include some frequency agile heterodyne processors. Frequency agility adds flexibility to the assignment of interactive elements to subscribers in the subscriber pool.

Additional resource assignment flexibility is provided by the rf output switcher-combiner 16 which takes the carrier frequencies from the frequency agile modulators 182 and sends them to any one or more of the service areas. In this manner, interactive elements that are connected through to the rf switcher-combiner can be diverted to assist a service area in which there is a large number of requesting subscribers. In accordance with the present invention, it is not necessary to provide enough modulators and interactive elements to fill every channel for every service area. For example, with ten service areas each with thirty-five interactive carrier frequencies, the present system operates well with fewer than 350 interactive elements.

A typical broadband plant such as a cable television system serving a mid-sized city with perhaps 50,000 subscribers and building hybrid fiber-coaxial plants with approximately 500 subscribers per service area will have one hundred fiber service areas or service neighborhoods. Furthermore, though the frequency axis of the rf switch is the same for fiber service areas of a given size, 500 homes in this example, the large number of fiber service areas, one hundred in this example, presents a problem of rf crosstalk to the "horizontal" or physical switching axis. Crosstalk results from the large number of adjacent switch elements used at high frequencies, about 400 MHz up to 750 MHz—the band typically reserved for interactive television. Though the crosstalk problem is surmountable, it can add considerable cost to the switch. However, in addition to the novel concept of creating a metropolitan area switch for television channels using frequency on one axis and physical switching on the other, this invention further refines the concept by limiting the number of services areas served by the switch and using multiple smaller switches with little impact on the overall complexity of the total system. The net effect is to use a switch sub-system to serve five to ten fiber service areas and to use enough switch sub-systems to support the entire plant. Following the example above, and assuming ten fiber service areas per switch sub-system, then ten switch sub-systems would be needed to serve the entire metropolitan area of our example city. So, ten smaller switches have the same economy of one large switch but without the crosstalk problem.

Figure 10:
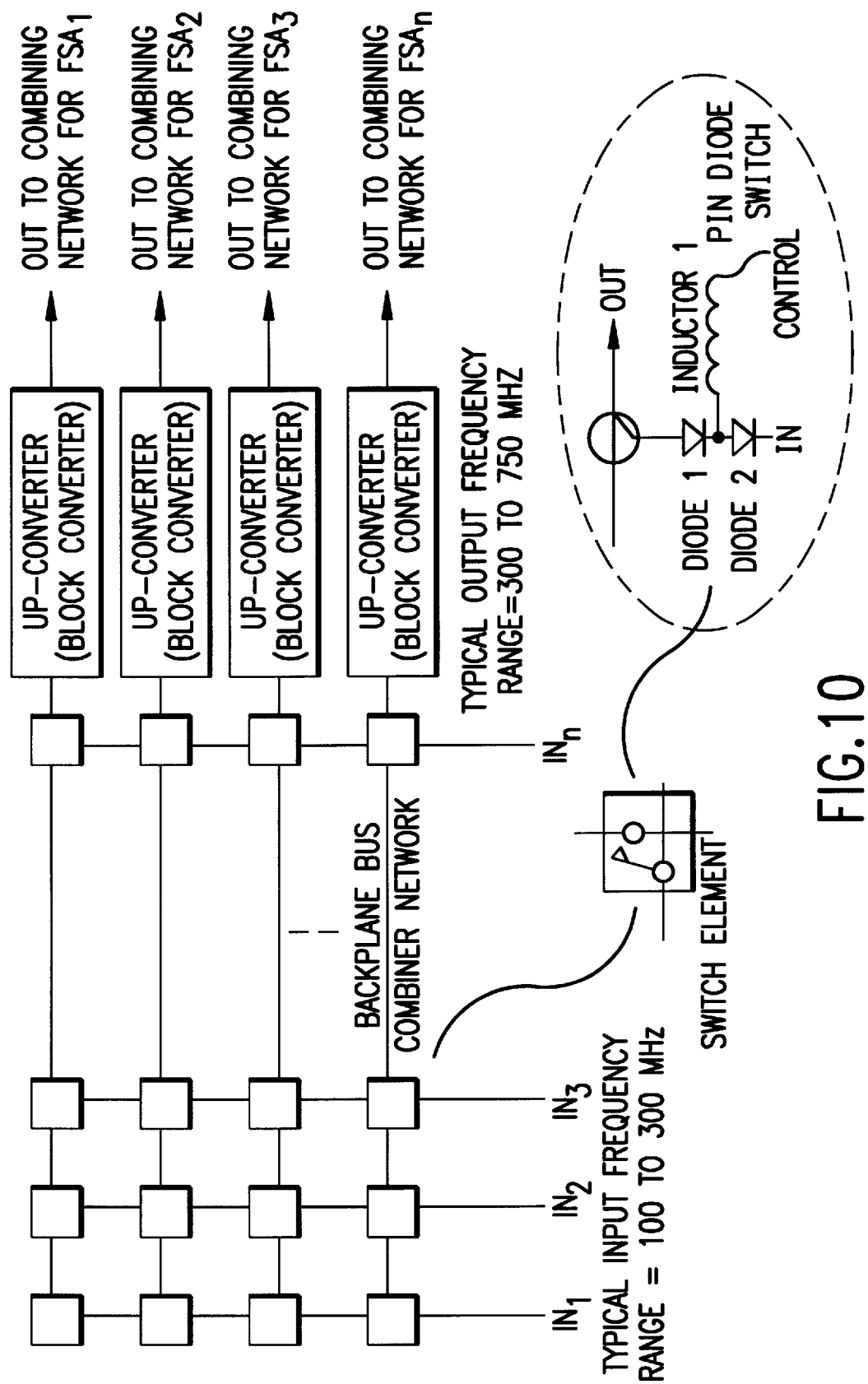
FIG. 10 is a drawing of an output switch and combiner of FIG. 1.

Referring now to FIG. 10, an rf switcher-combiner 16 of the present invention is illustrated. The rf switch is formed on a printed circuit board by a conventional PIN diode switch. The switch connected to the assigned FSA will be closed by a control signal originating with the system manager 22. The switches are connected to a combining network for combining all signals directed to a service area. The system may be arranged with the rf processing units 14 putting the television information signals on their assigned frequencies directly. Alternatively, the rf processing units may use an alternate block of frequencies, for example, 100 to 300 MHz. The output to each service area from the switcher-combiner 16 would then need to be directed through a block converter to put the signals in their finally assigned frequencies. The block converter may, for example, up convert the signals from the 100 to 300 MHz range into the 300 to 750 MHz range.

It is unnecessary to provide switching capability across all service areas serviced by a node. Sufficient flexibility to handle excess peak usage may be satisfied by providing modulators that are switched to among only a portion of the service areas. For example, some modulators may be switchable between two of the service areas. Other modulators may be switchable among four of the service areas. An adequate distribution of switching capability should be sufficient to satisfy a peak simultaneous usage condition in any of the service areas.

I claim:

1. A television information system having a headend for supplying a plurality of information services comprising:

a plurality of modulated video providers in communication with said headend, each modulated video provider assignable to a subscriber from a subscriber pool for placing an information service selected by the subscriber on a carrier frequency assigned to the subscriber;

a first plurality of transmission links, each transmission link providing a preselected group of subscribers from the subscriber pool access to a plurality of carrier frequencies such that a carrier frequency may be reused concurrently by an identical carrier frequency on different ones of said transmission links to service different ones of the subscribers from the subscriber pool;

a system manager for assigning one of said modulated video providers and a carrier frequency to a subscriber from the subscriber pool requesting service; and a first rf switch that can selectively connect the carrier frequency from at least one of the modulated video providers to any of a plurality of transmission links in said first plurality of transmission links, said first rf switch controlled by said system manager for directing each carrier frequency from said plurality of modulated video providers to the transmission link, in said first plurality of transmission links, providing access to the subscriber assigned to the carrier frequency, said system manager controlling said first rf switch and the assignment of carrier frequencies so that a carrier frequency and its identical carrier frequency from a different modulated video provider are not directed to the same transmission link.

2. A cable distribution system comprising:

a plurality of transmission means, each providing cable service to a plurality of subscribers and each carrying a plurality of carrier frequencies for the transmission of television information services;

a plurality of video provider elements for providing one of a plurality of television information services;

a plurality of rf processing units, each for receiving a television information service provided by one of said video provider elements and for placing the television information service on one carrier frequency from any of said plurality of carrier frequencies;

a system manager for assigning any of said plurality of subscribers that requests a television information service to one of said video provider elements and to one carrier frequency of said plurality of carrier frequencies carried by the transmission means of the requesting subscriber; and an rf switch connected between said plurality of rf processing units and said plurality of transmission means for connecting the carrier frequency from one of said rf processing units to the transmission means providing access to the subscriber assigned to the video provider element associated with said one of said rf processing units.

3. The cable distribution system of claim 2 wherein said rf switch can connect one of said rf processing units to any one or more of said transmission means.

4. The cable distribution system of claim 2 wherein a portion of said rf processing units modulate to a fixed carrier frequency and a remaining portion of said rf processing units may be controlled to modulate to any of a range of carrier frequencies.

5. The cable distribution system of claim 4 wherein said rf processing units modulating to a fixed carrier frequency are connected to one of said transmission means.

6. The cable distribution system of claim 2 wherein at least some of said video provider elements and at least some of said rf processing units are paired so that each video provider element in the at least some of said video provider elements is connected to one of said rf processing units in the at least some of said rf processing units.

7. The cable distribution system of claim 2 further comprising a communication gateway coupled through a data communication link with the subscribers on said plurality of transmission means, said communication gateway arranging data communication between a subscriber and the video provider element assigned to the subscriber.

8. The cable distribution system of claim 7 wherein said plurality of video provider elements includes a plurality of interactive elements.

9. The cable distribution system of claim 7 wherein said plurality of video provider elements comprises a plurality of interactive application processes and the video provider element assigned to the subscriber is one of said plurality of interactive application processes.

10. The cable distribution system of claim 2 comprising an rf combiner connected to a source of broadcast channels and to said rf switch for combining the broadcast channels with each of the plurality of carrier frequencies for delivery to each of the respective transmission means in said plurality of transmission means.

11. The television information system of claim 1 further comprising a communication gateway coupled through a data communication link with the subscribers on said first plurality of transmission links, said communication gateway arranging data communication between a subscriber and the modulated video provider assigned to the subscriber.

12. The television information system of claim 11 wherein said plurality of modulated video providers includes a plurality of interactive elements and a plurality of rf processing units.

13. The television information system of claim 11 wherein said plurality of modulated video providers comprises a plurality of interactive application processes and a plurality of rf processing units.

14. The television information system of claim 1 further comprising an rf combiner connected to a source of broadcast channels and to said first rf switch for combining the broadcast channels with each of the plurality of carrier frequencies for delivery to each of the respective transmission links in said first plurality of transmission links.

15. The television information system of claim 1 further comprising a second plurality of transmission links and a second rf switch that can selectively connect the carrier frequency from at least one of the modulated video providers to any of a plurality of transmission links in said second plurality of transmission links, said second rf switch controlled by said system manager for directing each carrier frequency from said plurality of modulated video providers to the transmission link in said second plurality of transmission links of the subscriber assigned to the carrier frequency, said system manager controlling said second rf switch and the assignment of carrier frequencies so that a carrier frequency and its identical carrier frequency from a different modulated video provider are not directed to the same transmission link.

16. A television information system having a headend for supplying a plurality of information services comprising:

a plurality of modulated video providers in communication with said headend, each modulated video provider assignable to a subscriber from a subscriber pool for placing an information service selected by the subscriber on a carrier frequency assigned to the subscriber;

a plurality of transmission links, each transmission link providing a preselected group of subscribers from the subscriber pool access to a plurality of carrier frequencies such that a carrier frequency may be reused concurrently by an identical carrier frequency in different ones of said transmission links; and a switch that can selectively connect the carrier frequency from at least one of the modulated video providers to any transmission link in a subset of transmission links in said plurality of transmission links, said subset being less than or equal to all the transmission links in said plurality of transmission links, said switch selectively coupling modulated video providers with subscribers by directing each of the plurality of carrier frequencies from said plurality of modulated video providers to the transmission link including a subscriber to be coupled.

17. The television information system of claim 16 further comprising a communication gateway coupled through a data communication link with the subscribers on said plurality of transmission links, said communication gateway arranging data communication between a subscriber and the modulated video provider assigned to the subscriber.

18. The television information system of claim 17 wherein said plurality of modulated video providers includes a plurality of interactive elements and a plurality of rf processing units.

19. The television information system of claim 17 wherein said plurality of modulated video providers comprises a plurality of interactive application processes and a plurality of rf processing units.

20. The television information system of claim 16 comprising an rf combiner connected to a source of broadcast channels and to said switch for combining the broadcast channels with each of the plurality of carrier frequencies for delivery to each of the respective transmission links in said plurality of transmission links.

21. A cable distribution system comprising:
   a plurality of transmission means, each providing broadcast cable service to a plurality of subscribers and each carrying a plurality of carrier frequencies for the transmission of television information services;
   a plurality of video provider elements for providing one of a plurality of television information services;
   a plurality of modulators, each modulator receiving the television information service from one of said video provider elements, for placing the television information service on one carrier frequency of said plurality of carrier frequencies; and
   a switch connected between said plurality of modulators and said plurality of transmission means for coupling a video provider element to a subscriber by directing the carrier frequency from the one of said modulators receiving the television information signal from the video provider element to the transmission means of the subscriber.

22. The cable distribution system of claim 21 further comprising a communication gateway coupled through a data communication link with the subscribers in said plurality of transmission means, said communication gateway arranging data communication between a subscriber and the video provider element coupled thereto.

23. The cable distribution system of claim 22 wherein said plurality of video provider elements includes a plurality of interactive elements.

24. The cable distribution system of claim 22 wherein said plurality of video provider elements comprises a plurality of interactive application processes and the video provider element coupled to the subscriber is one of said plurality of interactive application processes.

25. The cable distribution system of claim 21 comprising an rf combiner connected to a source of broadcast channels and to said switch for combining the broadcast channels with each of the plurality of carrier frequencies for delivery to each of the respective transmission means in said plurality of transmission means.

* * * * *